(12) United States Patent
Nielsen-Cole (10) Patent No.: US 11,613,019 B2
(45) Date of Patent: Mar. 28, 2023

(54) CASCADED SELF-SIMILAR ROBOTIC ASSEMBLIES

(71) Applicant: Orbital Composites, Inc., San Jose, CA (US)

(72) Inventor: Cole Nielsen-Cole, San Jose, CA (US)

(73) Assignee: Orbital Composites, Inc., Campbell, CA (US)

( * ) Notice: Subject to any disclaimer, the term of this patent is extended or adjusted under 35 U.S.C. 154(b) by 920 days.

(21) Appl. No.: 16/221,446

(22) Filed: Dec. 15, 2018

(65) Prior Publication Data

US 2019/0184550 A1    Jun. 20, 2019

Related U.S. Application Data

(60) Provisional application No. 62/645,168, filed on Mar. 19, 2018, provisional application No. 62/599,632, filed on Dec. 15, 2017.

(51) Int. Cl.
| | |
|---|---|
| *B25J 9/00* | (2006.01) |
| *B25J 9/16* | (2006.01) |
| *B25J 15/00* | (2006.01) |
| *B33Y 50/02* | (2015.01) |
| *B29C 48/25* | (2019.01) |

(Continued)

(52) U.S. Cl.
CPC ........... *B25J 9/1694* (2013.01); *B25J 9/0084* (2013.01); *B25J 15/0009* (2013.01); *B29C 48/0023* (2019.02); *B29C 48/25* (2019.02); *B29C 48/251* (2019.02); *B29C 64/118* (2017.08); *B29C 64/188* (2017.08); *B29C 64/209* (2017.08); *B29C 64/268* (2017.08); *B29C 64/386* (2017.08); *B29C 64/393* (2017.08);

(Continued)

(58) Field of Classification Search
CPC ... B29C 64/379; B29C 48/0023; B29C 48/25; B29C 48/251; B29C 64/118; B29C 64/188; B29C 64/209; B29C 64/268; B29C 64/386; B29C 64/393; B25J 9/1694; B25J 9/0084; B25J 15/0009; B25J 19/023; B33Y 30/00; B33Y 50/02; G05B 19/4099
See application file for complete search history.

(56) References Cited

U.S. PATENT DOCUMENTS

| | | | | |
|---|---|---|---|---|
| 2008/0138182 A1* | 6/2008 | Johnson | ................... | B64F 1/322 |
| | | | | 135/88.13 |
| 2013/0295338 A1* | 11/2013 | Keating | .................. | B28B 7/346 |
| | | | | 425/375 |

(Continued)

*Primary Examiner* — Jeffrey M Wollschlager
*Assistant Examiner* — Kelsey C Grace
(74) *Attorney, Agent, or Firm* — AdamantineIP (57) ABSTRACT

A robotic system with an arm assembly that includes: a pedestal, a first member operatively coupled to an opposing end of the pedestal, and a second member operatively coupled to an opposing end of the first member. The robotic system further includes a joint operatively coupled to an opposing end of the second member and at least one phalange assembly operatively coupled to the joint. The at least one phalange assembly includes: a third member operatively coupled to the joint, a fourth member operatively coupled to an opposing end of the third member, and a fifth member operatively coupled to an opposing end of the fourth member. The robotic system further includes an interchangeable manipulator is operatively coupled to the opposing end of the fifth member.

33 Claims, 10 Drawing Sheets

(51) Int. Cl.
  *B29C 64/268* (2017.01)
  *B29C 64/209* (2017.01)
  *B29C 64/386* (2017.01)
  *B29C 48/00* (2019.01)
  *B29C 64/393* (2017.01)
  *B33Y 30/00* (2015.01)
  *B29C 64/118* (2017.01)
  *G05B 19/4099* (2006.01)
  *B29C 64/188* (2017.01)

(52) U.S. Cl.
  CPC .............. *B33Y 30/00* (2014.12); *B33Y 50/02* (2014.12); *G05B 19/4099* (2013.01)

(56) References Cited

U.S. PATENT DOCUMENTS

2015/0076732 A1* 3/2015 Kemmer ............... B29C 64/118
  264/255
2016/0184996 A1* 6/2016 Ishige ................... B25J 9/1694
  700/254
2016/0221768 A1* 8/2016 Kadaba ............. G06Q 10/0833
2017/0335561 A1* 11/2017 Wickramasekera .........................
  E04B 1/34363

* cited by examiner

CASCADED SELF-SIMILAR ROBOTIC ASSEMBLIES

CROSS-REFERENCE TO RELATED APPLICATIONS

The present application claims priority to Provisional Application No. 62/599,632, titled "Methods and Apparatus to Build Objects Based on 3D Printing, Applicable to Wide Resolutions and Scales, and Diverse Range of Materials," filed Dec. 15, 2017, and to Provisional Application No. 62/645,168, titled "Method and Apparatus to Build Objects of Different Sizes Using 3D Printers in Stackable Containers with Inflatable Environmental Barriers," filed Mar. 19, 2018, which are hereby incorporated by reference in its entirety.

FIELD

The present disclosure generally relates to robotic assemblies and, more specifically, to a technique for cascading robotic assemblies and enclosing the cascaded robot assemblies in stackable containers with a deployable environmental barrier.

BACKGROUND

Current additive manufacturing techniques implement a selective compliant assembly (or Articulated) robot arm SCARA robots, Cartesian robots, and/or Delta robots for an accurate, quick material handling solution that have a broad movement range and flexibility. However, the throughput of such robots limits the manufacturing speed. Techniques and systems for robots with higher throughput in additive manufacturing is desired.

SUMMARY

The following presents a simplified summary of one or more examples in order to provide a basic understanding of the disclosure. This summary is not an extensive overview of all contemplated examples, and is not intended to either identify key or critical elements of all examples or delineate the scope of any or all examples. Its purpose is to present some concepts of one or more examples in a simplified form as a prelude to the more detailed description that is presented below.

In accordance with some examples, a robotic system, comprising: an arm assembly including: a pedestal; a first member operatively coupled to an opposing end of the pedestal, wherein the first member is configured to rotate about the opposing end of the pedestal; a second member operatively coupled to an opposing end of the first member, wherein the second member is configured to rotate about the opposing end of the first member; and a joint operatively coupled to an opposing end of the second member; at least one phalange assembly operatively coupled to the joint, the at least one phalange assembly including: a third member operatively coupled to the joint; a fourth member operatively coupled to an opposing end of the third member, wherein the fourth member is configured to rotate about the opposing end of the third member; and a fifth member operatively coupled to an opposing end of the fourth member, wherein the fifth member is configured to rotate about the opposing end of the fourth member; and an interchangeable manipulator operatively coupled to the opposing end of the fifth member.

In accordance with some examples, a robotic system, comprising: a cargo container; one or more rails operatively coupled to a wall of the cargo container; one or more rollers, wherein the one or more rollers interconnect with the one or more rails; and an arm assembly including: a pedestal operatively coupled to the one or more rollers; a first member operatively coupled to an opposing end of the pedestal, wherein the first member is configured to rotate about the opposing end of the pedestal; a second member operatively coupled to an opposing end of the first member, wherein the second member is configured to rotate about the opposing end of the first member; a joint operatively coupled to an opposing end of the second member; and at least one phalange assembly operatively coupled to the joint.

In accordance with some examples, a 3D printing system, comprising: a cargo container; one or more rails operatively coupled to a wall of the cargo container; one or more rollers, wherein the one or more rollers interconnect with the one or more rails; and an arm assembly including: a pedestal operatively coupled to the one or more rollers; a first member operatively coupled to an opposing end of the pedestal, wherein the first member is configured to rotate about the opposing end of the pedestal; a second member operatively coupled to an opposing end of the first member, wherein the second member is configured to rotate about the opposing end of the first member; a joint operatively coupled to an opposing end of the second member; a positioning plate operatively coupled to the joint; a plurality of phalanges operatively coupled to the positioning plate, wherein each of the phalanges is self-similar to arm assembly, each of the phalanges include: a third member operatively coupled to the joint; a fourth member operatively coupled to an opposing end of the third member, wherein the fourth member is configured to rotate about the opposing end of the third member; and a fifth member operatively coupled to an opposing end of the fourth member, wherein the fifth member is configured to rotate about the opposing end of the fourth member; and an interchangeable manipulator operatively coupled to the opposing end of the fifth member.

In accordance with some examples, a method for additive manufacturing, the method comprising: receiving a 3D model corresponding to a 3D object; interpreting the 3D model into coordinates; transmitting the coordinates as set points to a controller, wherein the controller is configured to manipulate a robot and wherein the robot includes a first phalange assembly with a first interchangeable manipulator operatively coupled to an arm assembly and a second phalange assembly with a second interchangeable manipulator operatively coupled to the arm assembly, and wherein the arm assembly is self-similar to one or both of the first phalange assembly and the second phalange assembly; sensing the real-time location of the first interchangeable manipulator and the second interchangeable manipulator; determining error differences between the set points and the real-time locations; adjusting position of any one of the arm assembly, the at least one phalange assembly, and the interchangeable manipulator independently to reduce the error differences between the set points and the real-time locations.

BRIEF DESCRIPTION OF THE DRAWINGS

For a better understanding of the various described examples, reference should be made to the description below, in conjunction with the following figures in which like-referenced numerals refer to corresponding parts throughout the figures. It should be understood that the features depicted herein are not necessarily to scale.

DETAILED DESCRIPTION

The following description is presented to enable a person of ordinary skill in the art to make and use the various examples. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the various examples. Thus, the various examples are not intended to be limited to those described herein and shown, but are to be accorded the scope consistent with the claims.

The present examples generally relate to pluralities of robotic systems in additive manufacturing techniques. As will be seen, the present robotic systems include an arm assembly operatively coupled to a phalange assembly with one or more phalanges. One or more manipulators operatively coupled to the one or more phalanges are configured to manufacture in concert. That is, the one or more phalanges are capable of independent function and synergistically function together in serial and/or in parallel for manufacturing. For example, one of the one or more phalanges includes a gripper to grasp a work-piece, while another of the one or more phalanges include a welder to weld the work-piece to a structure. It should be appreciated that manufacturing robotic assemblies can be tailored in size and complexity by housing them in stackable cargo containers. Such stackable cargo containers utilize deployable doors to expose the robot to the outside. Examples of robotic assemblies will now be presented with reference to various elements of a system. The techniques will be described in the following detailed description and illustrated in the accompanying drawing by various blocks, components, exemplary models, etc. and may be implemented using composite materials, constituent materials, electronic hardware, computer software, or any combination thereof.

Figure 1:
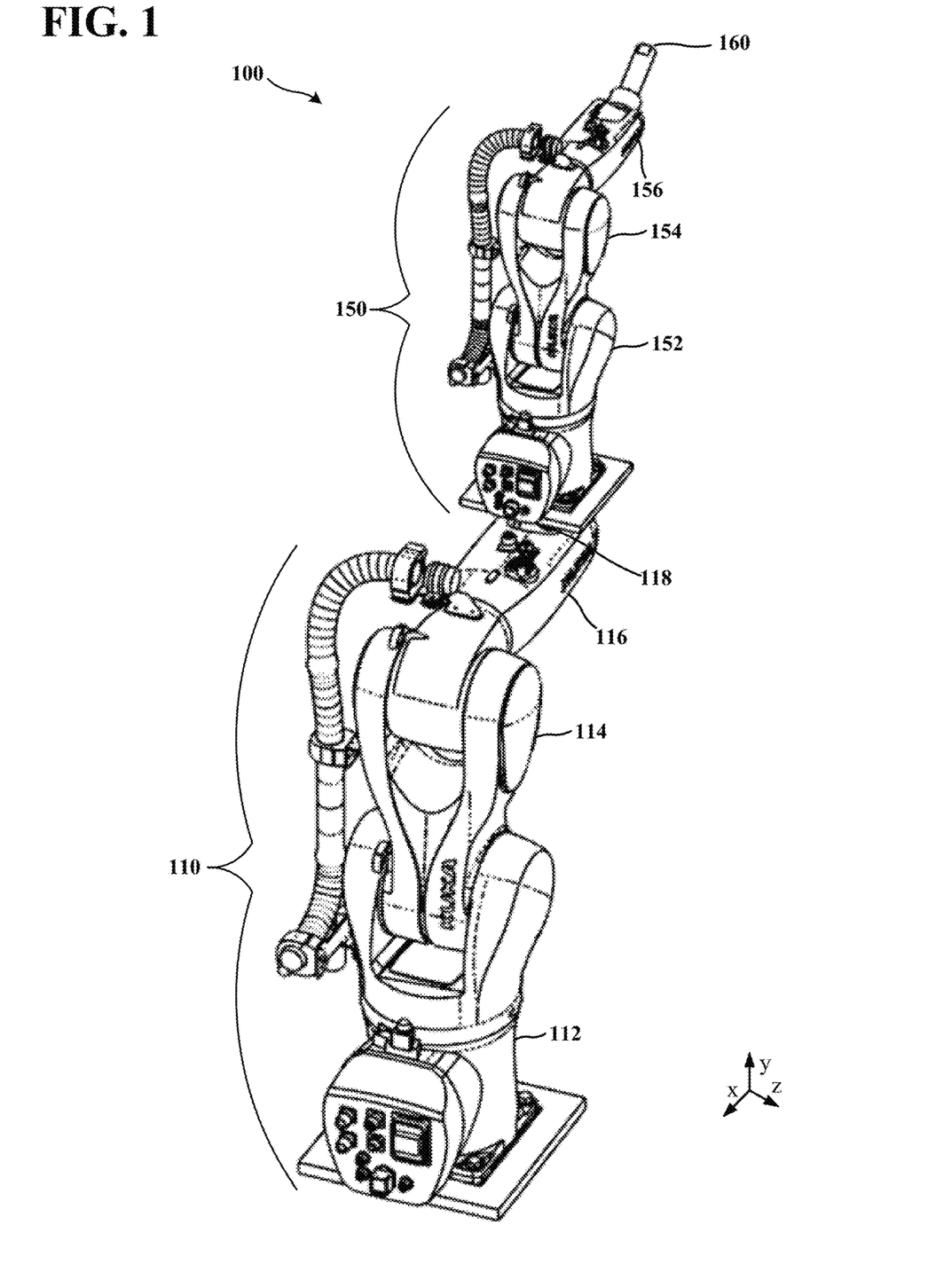
FIG. 1 illustrates a robot assembly according to an example of the present invention.

FIG. 1 illustrates a robot assembly 100 having an arm assembly 110 and a phalange assembly 150 with a interchangeable manipulator 160. The arm assembly 110 includes a pedestal 112, a first member 114, a second member 116, and a joint 118. The pedestal 112 provides a footing for the robot assembly 100. In some examples, the pedestal 112 has a base that is bracketed to a foundation. In some examples, the pedestal 112 is operatively coupled to a rail system that include at least one rail with one or more interlocking rollers. A first member 114 is operatively coupled to an opposing end of the pedestal 112. The first member 114 is configured to rotate about the opposing end of the pedestal 112. As depicted in FIG. 1, a second member 116 is operatively coupled to an opposing end of the first member 11. The second member 116 is configured to rotate about the opposing end of the first member 114. The joint 118 is operatively coupled to an opposing end of the second member 116. In some examples, the arm assembly 110 is anthropomorphic.

As depicted in FIG. 1, the phalange assembly 150 is operatively coupled to the joint 118. The phalange assembly 150 includes, a third member 152, a fourth member 154, and a fifth member 156. The third member 152 is operatively coupled to the joint 118. The fourth member 154 is operatively coupled to an opposing end of the third member 152. The fourth member 154 is configured to rotate about the opposing end of the third member 152. The fifth member 156 is operatively coupled to an opposing end of the fourth member 154. The fifth member 156 is configured to rotate about the opposing end of the fourth member 154. In some examples, the phalange assembly 150 is self-similar to the arm assembly 110. That is, a self-similar object is exactly or approximately similar to a part of itself. For example, the third member 152, the fourth member 154, and the fifth member 156 of the phalange assembly 150 are respectively a miniature version of the pedestal 112, the first member 114, and the second member 116 of the arm assembly 110.

The robot assembly 100 further includes an interchangeable manipulator 160 operatively coupled to the opposing end of the fifth member 156 of the phalange assembly 150. In some examples, the interchangeable manipulator 160 is a printer head assembly for a 3D printer configured to deposit one or more filaments on a work-piece. In some examples, the printer head includes a coaxial extruder configured to extrude a core material coaxially aligned with a cladding material to additively manufacture a work-piece. In some examples, the printer head assembly has a coaxial extruder with at least one filament of the one or more filaments being coaxially extruded with respect to another. In some examples, the interchangeable manipulator 160 is a shaping actuator configured to shape an extruded layer deposited on the work-piece. In some examples, the shaping actuator includes a heating element and a pressure regulator. In some examples, the interchangeable manipulator 160 is a gripper configured to grasp elements of a work-piece. In some examples, the interchangeable manipulator 160 is a tooling fixture for any one of a screw driver (e.g., Phillips, Flathead, Torx, etc.), socket, and drill bit, impact driver (e.g., jack hammer, impact drill, etc.), welder (e.g., MIG welder, arc welder, etc.), laser (e.g., sintering laser, cutting laser, welding laser, etc.), nozzle (e.g., metal and/or polymer powder emitter), mirror configured to redirect laser light.

Figure 2:
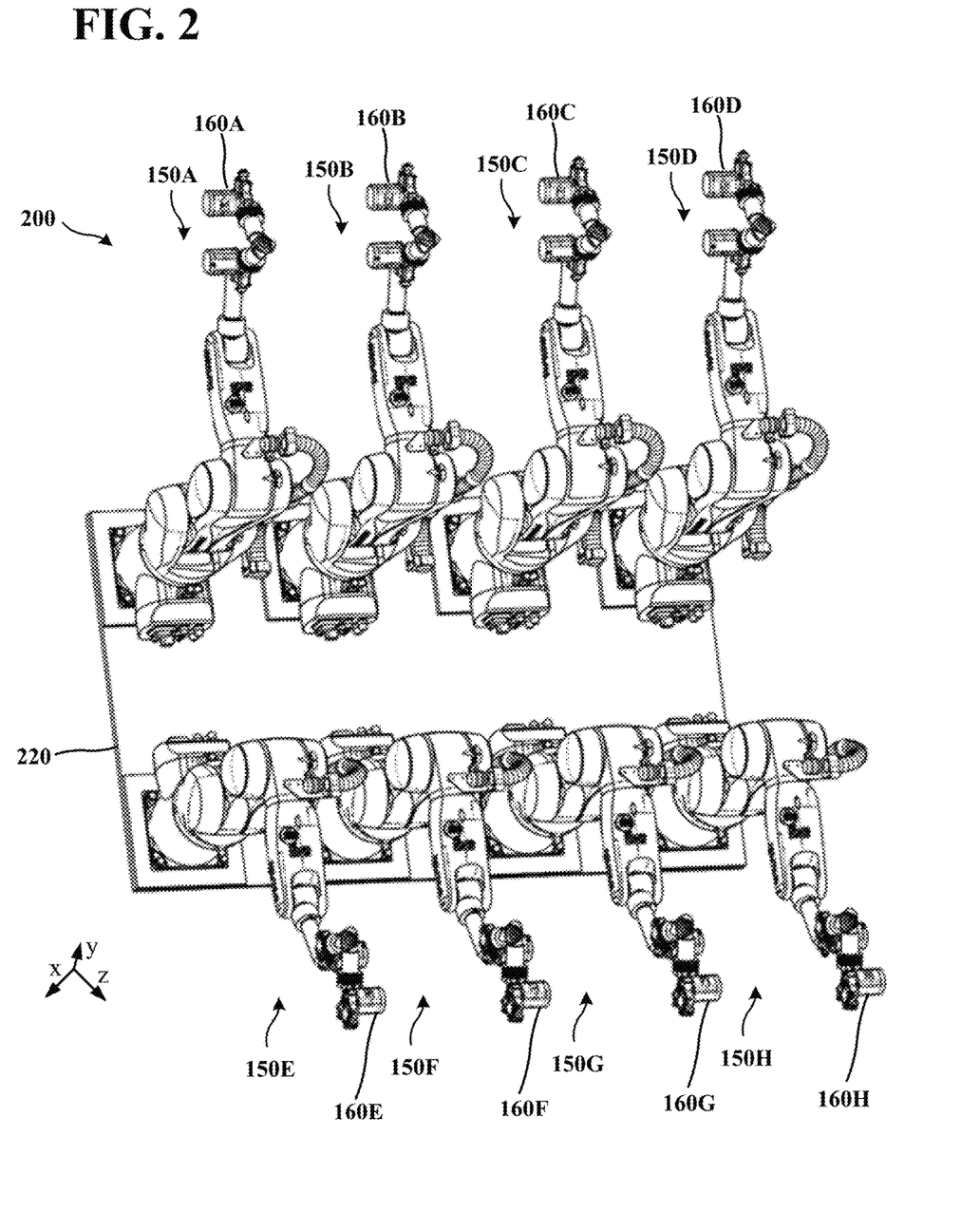
FIG. 2 illustrates a phalange assembly array with a plurality of phalange assemblies according to an example of the present invention.

FIG. 2 illustrates a phalange assembly array 200 with a plurality of phalange assemblies (e.g., 150A, 150B, 150C, 150D, 150E, 150F, 150G, 150H). The plurality of phalange assemblies are mounted to a positioning plate 220, which in relation to the arm assembly 110 and the phalange assembly 150 depicted in FIG. 1, is interposed between the joint 118 and the third member 152. In some examples, the plurality of phalanges assemblies (e.g., 150A, 150B, 150C, 150D, 150E, 150F, 150G, 150H) are self-similar to the arm assembly 110. In some examples, the plurality of phalanges assemblies (e.g., 150A, 150B, 150C, 150D, 150E, 150F, 150G, 150H) are self-similar to each other. In some examples, the plurality of phalanges assemblies (e.g., 150A, 150B, 150C, 150D, 150E, 150F, 150G, 150H) include interchangeable manipulators 160 with at least one that is dissimilar to others. For example, as depicted in FIG. 2, interchangeable manipulators 160C and 160G are shaping actuators whereas interchangeable manipulators 160A, 160B, 160D, 160E, 160F, and 160H are printer head assemblies. In the example depicted in FIG. 2, the positioning plate 220 is rigid. In some examples, the positioning plate 220 is flexible. In some examples, the positioning plate 220 is articulated. In some such examples, the articulated positioning plate 220 has two or more sections connected by a flexible joint. In some such examples, the articulated positioning plate 220 resembles a metatarsal with metatarsophalangeal joints.

Figure 3:
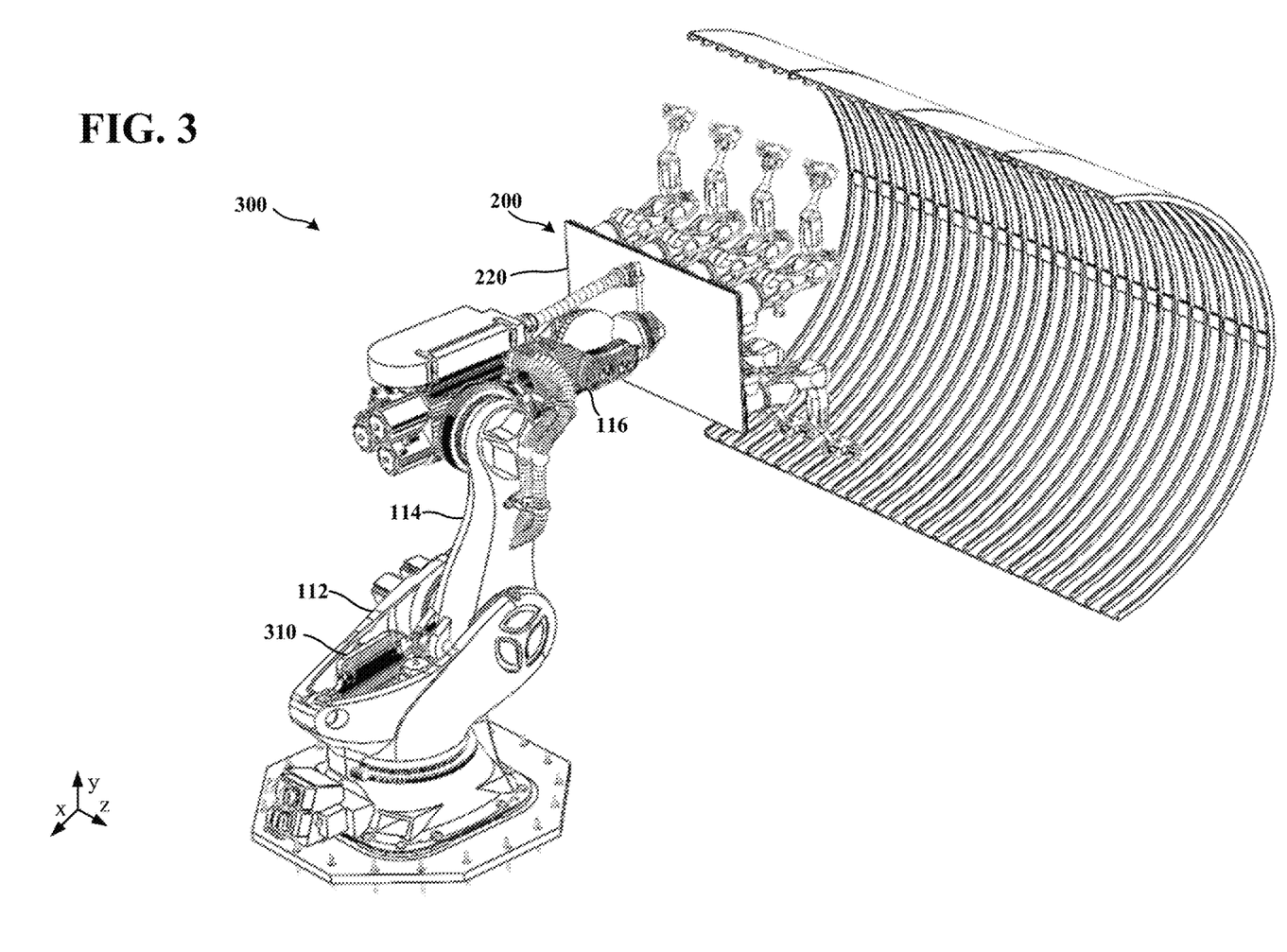
FIG. 3 illustrates a scaled robotic assembly with a phalange assembly array according to an example of the present invention.

FIG. 3 illustrates a scaled robotic assembly 300 with a phalange assembly array 200. By comparison the robot assembly 100 of FIG. 1 corresponds to a smaller version of the robotic assembly 300. As depicted, the pedestal 112, the first member 114, and the second member 116 of the scaled robotic assembly 300 has been structurally reinforced and has larger actuators 310. The phalange assembly 150 of scaled robotic assembly 300 is self-similar to the arm assembly 110 of scaled robotic assembly 300. In some examples, the arm assembly 110 of the robot assembly 100 of FIG. 1 corresponds to the phalange assembly 150 of scaled robotic assembly 300.

Figure 4:
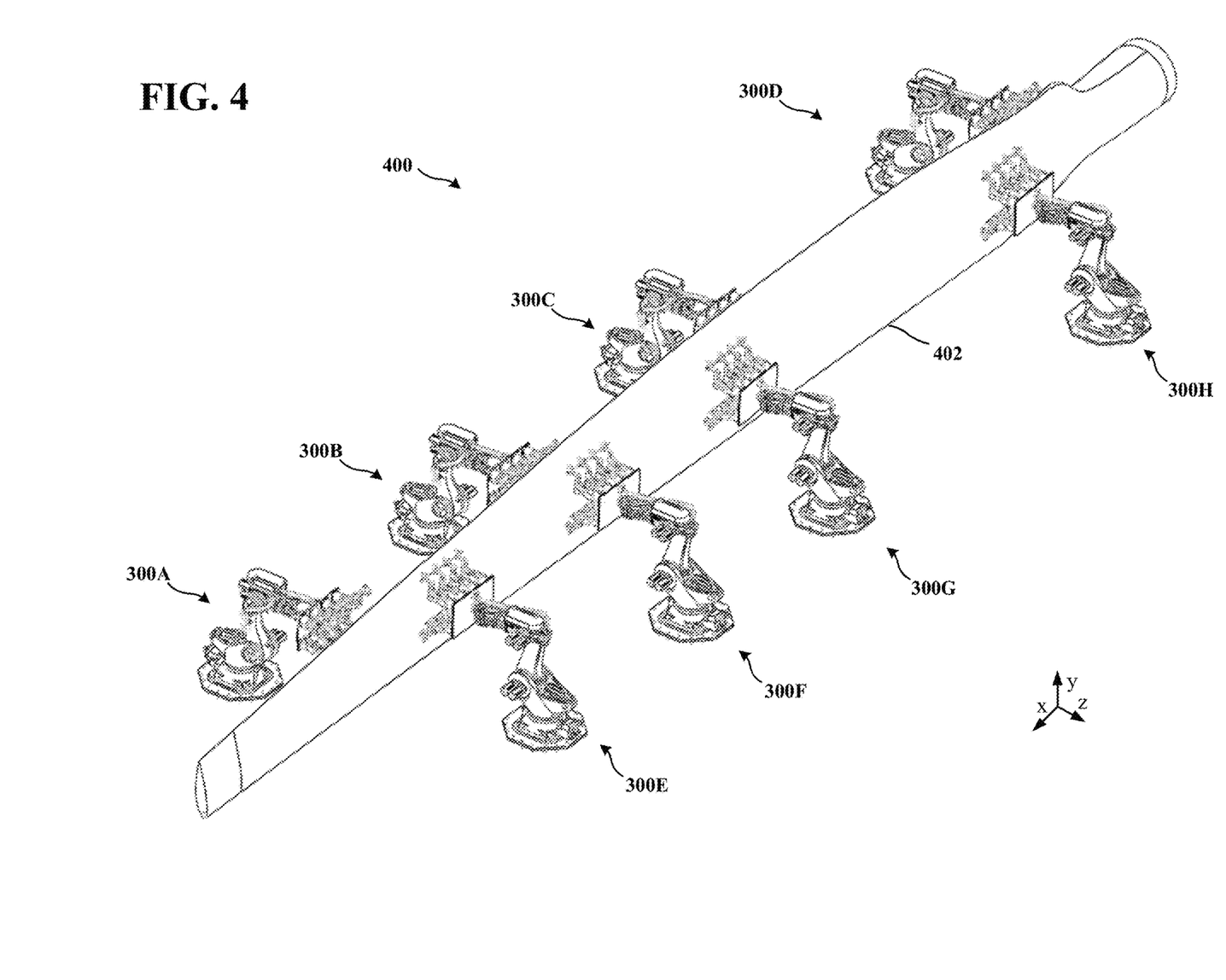
FIG. 4 illustrates a robotic system with scaled robotic assemblies according to an example of the present invention.

FIG. 4 illustrates a scaled robotic system 400 with scaled array of robotic assemblies (e.g., 300A, 300B, 300C, 300D, 300E, 300F, 300G, 300H). The scaled robotic assembly 300 with a phalange assembly array 200 of FIG. 3 are arrayed to manufacture a rotor blade 402 of a windmill. As depicted, the phalange assembly array 200 is self-similar to the scaled array of robotic assemblies (e.g., 300A, 300B, 300C, 300D, 300E, 300F, 300G, 300H) with the rotor blade 402 positioned between half of the scaled array of robotic assemblies. Importantly, the phalange assembly arrays 200 of each scaled array of robotic assembly (e.g., 300A, 300B, 300C, 300D, 300E, 300F, 300G, 300H) is configured to function in concert with each other to increase the throughput and increase the manufacturing speed.

Figure 5:
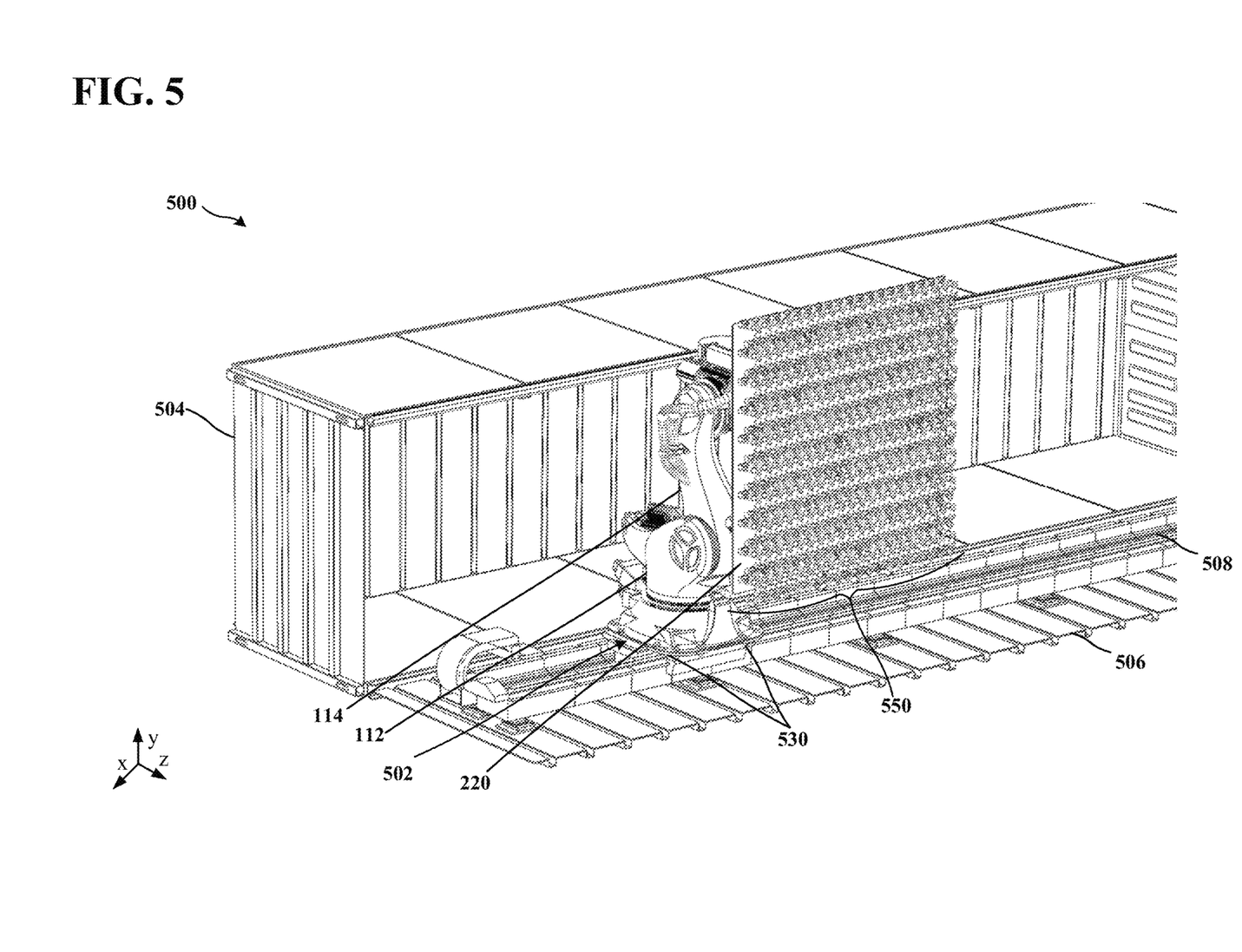
FIG. 5 illustrates a robotic assembly operatively coupled to a cargo container according to an example of the present invention.

FIG. 5 illustrates a robotic system 500 with a robotic assembly 502 operatively coupled to a cargo container 504. The cargo container 504 has corrugated steel sidewalls and is configured to be stackable On one sidewall of the cargo container 504, one or more rails 508 are operatively coupled. The one or more rails 508 are interconnected with one or more rollers 530 and operatively coupled to the pedestal 112. The one or more rollers 530 enable the robotic assembly 502 to move along the one or more rails 508 in a direction parallel to a long sidewall of the cargo container 504. This degree of freedom facilitates manufacture and throughput since each robot can move independently with or without movement from a work-piece being manufactured.

Similar to the scaled robotic assembly 300 of FIG. 3, the robotic assembly 502 includes an arm assembly 110 and a scaled phalange assembly array 550. Although the phalange assembly array 550 obstructs part of the arm assembly 110, it should be appreciated that the components are similar to the scaled robotic assembly 300 depicted in FIG. 3. The arm assembly 110 includes a pedestal 112, a first member 114, a second member 116, and a joint 118. The first member 114 operatively coupled to an opposing end of the pedestal 112. The first member 114 is configured to rotate about the opposing end of the pedestal 112. The second member 114 operatively coupled to an opposing end of the first member 114. The second member 116 is configured to rotate about the opposing end of the first member 114. The joint 118 is operatively coupled to an opposing end of the second member 116. In some examples, the joint 118 is interposed between an end of the pedestal and a base/foundation. In such examples, the joint 118 joint is configured to rotate about two mutually orthogonal axes. In some examples, the joint 118 is omitted and instead an end of the pedestal and a base/foundation is configured to rotate around a primary axis of the pedestal.

The phalange assembly 550 is operatively coupled to joint 118. The phalange assembly 550 includes a third member 152, a fourth member 154, and fifth member 156. The third member operatively coupled to the joint 118. The fourth member 154 is operatively coupled to an opposing end of the third member 152. The fourth member 154 is configured to rotate about the opposing end of the third member 152. The fifth member is operatively coupled to an opposing end of the fourth member 154. The fifth member 156 is configured to rotate about the opposing end of the fourth member 156.

As depicted in FIG. 5, the phalange assembly array 550 is scaled to be larger than a phalange assembly array 200 of FIG. 3. The phalange assembly array 550 includes an array of interchangeable manipulators 160 operatively coupled to a positioning plate 220 disposed on an opposing end of the fifth member 156. It should be appreciated that the size of the phalange assembly array 550 can be tailored to specific manufacturing applications. It should also be appreciated that the phalange assembly array 550 is self-similar to the scaled array of robotic assembly 502 and that each phalange assembly of the phalange assembly array 550 is configured to function in concert with each other. It should also be appreciated that the interchangeable manipulators 160 of each phalange assembly in the phalange assembly array 550 can be tailored for specific applications. For example, all the interchangeable manipulators 160 can be the same (e.g., a printer head assembly for a 3D printer). Alternatively, one or more interchangeable manipulators 160 in the phalange assembly array 550 is different (e.g., one or more printer head assemblies for a 3D printer, one or more grippers, one or more tooling fixtures, etc.).

In some examples, a sidewall of the cargo container includes a door configured to expose the arm assembly to an outside of the cargo container. For example, a sidewall depicted in FIG. 5 is configured as a door 506 and hinged along a long side edge of the sidewall to open outward from the cargo container 504. In this example, the one or more rails 508 are mounted on the door 506 itself to provide the longitudinal translation of the robotic assembly 502 during manufacturing. In some examples, the robotic assemblies are operatively coupled to a floor of the cargo container 504.

Figure 6:
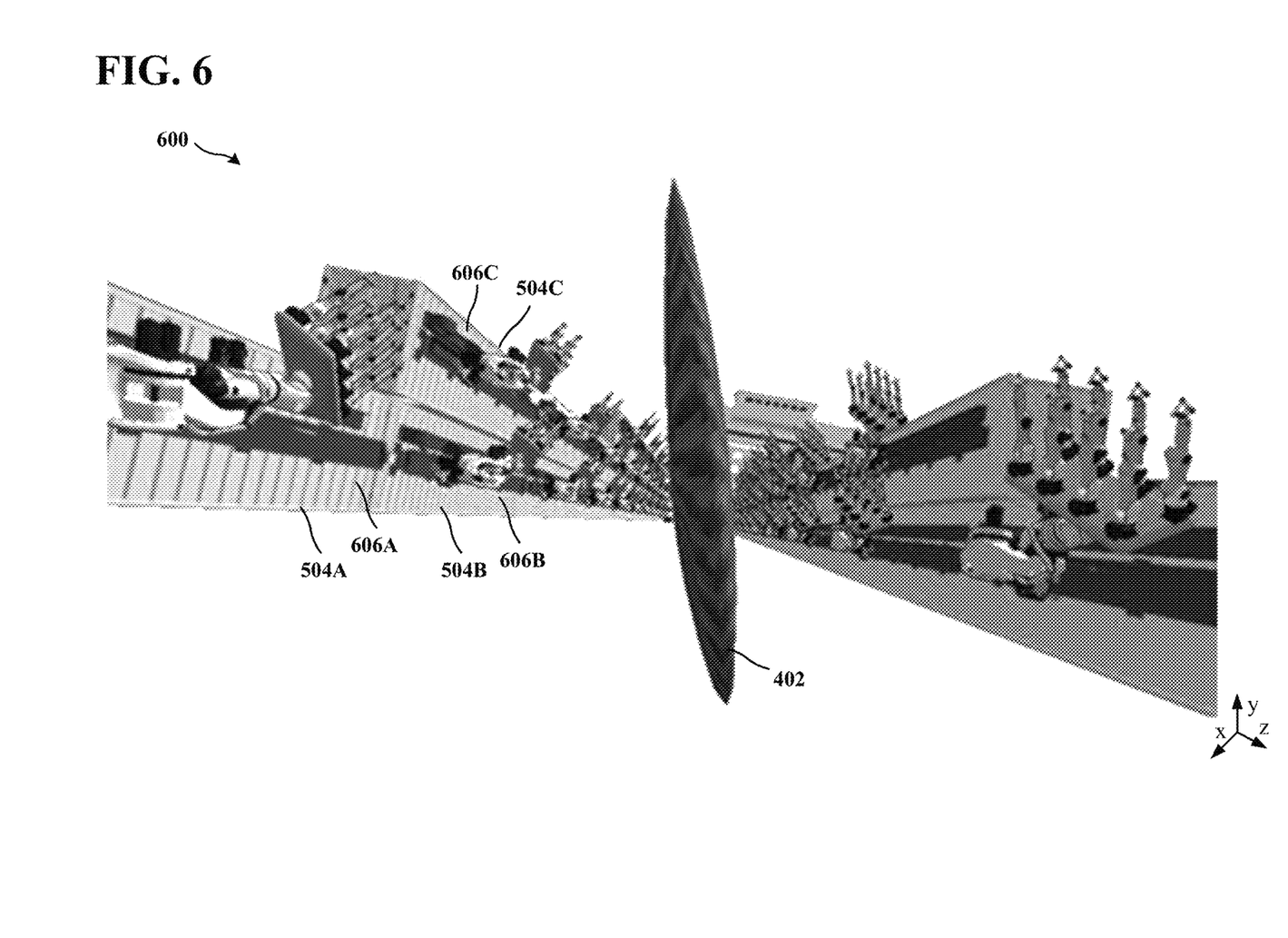
FIG. 6 illustrates an assembly line of interlocked cargo containers with a robotic assembly according to an example of the present invention.

FIG. 6 illustrates an assembly line of interlocked cargo containers 600 each with a robotic assembly. Similar to the array of scaled robotic assembly 300 of FIG. 3, the robotic assemblies of the cargo containers are manufacturing a rotor blade 402 of a windmill. Each cargo container is configured to interlock with one or more cargo containers on adjacent sides of the cargo container. In the example depicted in FIG. 6, the second cargo container 504B is interlocked with the first cargo container 504A one adjacent side (e.g., side by side) and interlocked with the third cargo container 504C another adjacent side (e.g., stacked). In some examples, one or more cargo containers are interlocked to form geodesic structures made from trusses and cables (e.g., geodesic spheres, domes, polyhedrons, arches, etc.). In such examples, the work-piece of manufacture is centrally located with respect to one or more interlocked cargo containers.

It should be appreciated that the robotic assembly 300 is configured to move along the one or more rails 508 in a direction parallel to a long sidewall of the cargo container. As depicted in FIG. 6, the one or more rails 508 of the robotic assemblies are operatively coupled to the sidewall/door (e.g., 606A, 606B, 606C) of a respective cargo container 504A, 504B, 504C. In contrast, to the door 506 of FIG. 5, which is hinged along a long side edge of the sidewall, the respective sidewall/doors 606A, 606B, 606C of cargo containers 504A, 504B, 504C are hinged along the center. This hinging action provides for the sidewall/doors 606A, 606B, 606C to rotate to the outside of the respective cargo container 504A, 504B, 504C, while the outside of the sidewall/doors rotate to the inside of the cargo container 504A, 504B, 504C. In some examples, the robotic assemblies are operatively coupled to a floor of a respective cargo container 504A, 504B, 504C. It should be appreciated that the robotic assemblies of each cargo containers (e.g., 504A, 504B, 504C) are configured to function in concert.

Figure 7:
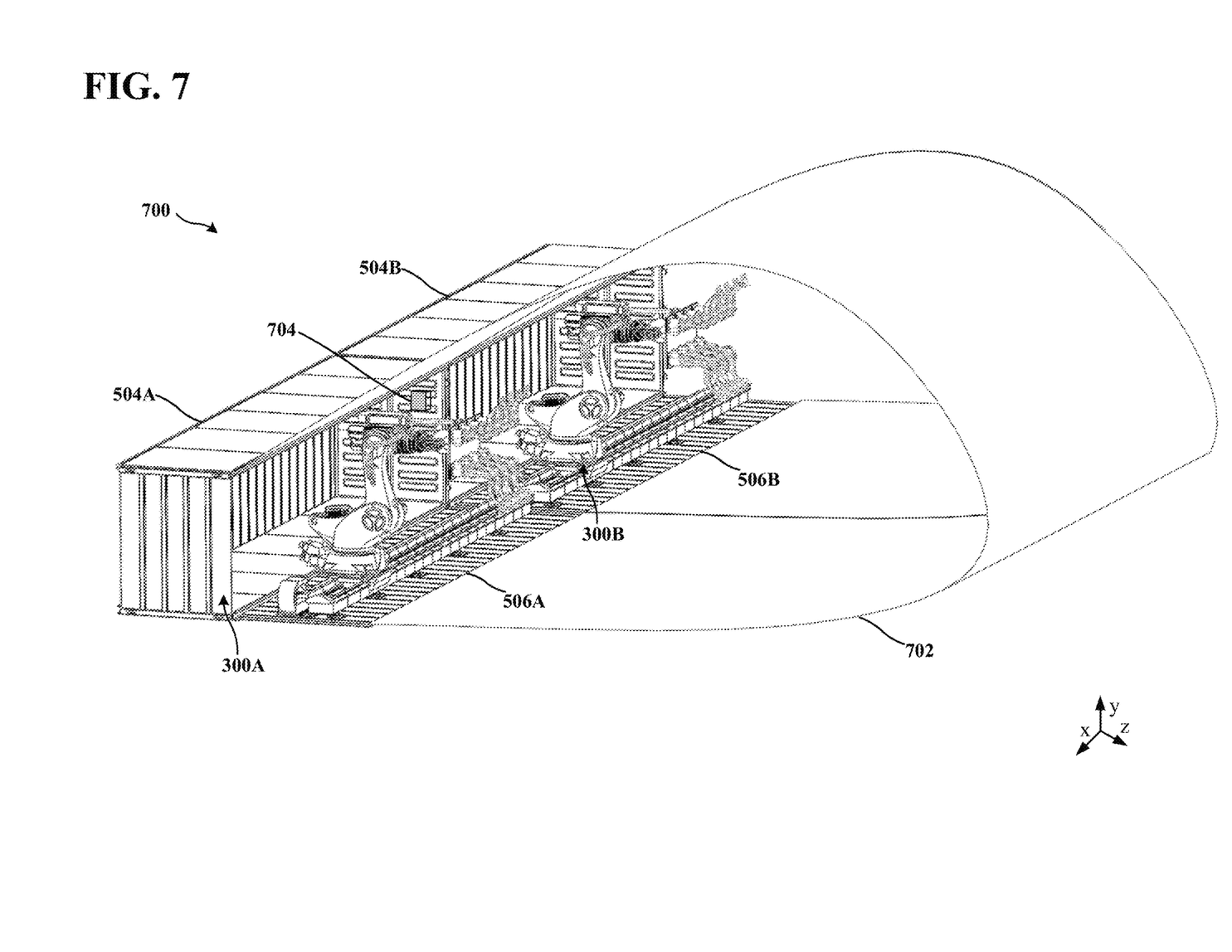
FIG. 7 illustrates a deployable barrier in a robotic system according to an example of the present invention.

FIG. 7 illustrates a deployable barrier 702 in a robotic system 700. In this example, a first cargo container 504A is adjacent to a second cargo container 504B and each cargo container (e.g., 504A, 504B) includes a scaled robotic assembly (e.g., 300A, 300B) with a phalange assembly array (e.g., similar to phalange assembly array 200 of FIG. 2). The deployable barrier 702 is attached to sidewalls of the first cargo container 504A and the second cargo container 504B in a manner that envelopes both the first scaled robotic assembly 300A and the second scaled robotic assembly 300B along with each arm assembly. The deployable barrier 702 is an enclosure configured to control the environment during manufacturing. In some examples, a fluid such as an inert gas or inert liquid inflates the deployable barrier 702 prior to opening the first door 506A and/or the second door 506B of the first cargo container 504A and the second cargo container 504B, respectively. In such an example, the deployable barrier 702 is hermetically sealed so that the fluid is maintained within the deployable barrier 702.

In some examples, one or both of the first cargo container 504A and the second cargo container 504B includes a fluid conditioner 704 configured to control humidity, temperature, pressure, and purity (e.g., filtering using a fluid filter) of the fluid. For example, once the deployable barrier 702 is inflated the fluid within is cycled to maintain the humidity, temperature, pressure inside as well as filtering the fluid to maintain purity.

It should be appreciated that the fluid conditioner 704 helps to prevent absorption of particulates (e.g., moisture, contaminants) by the manufactured parts during manufacturing, which, in turn reduces adverse effects such as warping, electronic impurities, etc. It should also be appreciated that controlling and maintaining a conditioned environment can increase throughput. For example, raising the temperature of the fluid during manufacturing increases diffusion and bonding rates, which can increase through put. It should also be appreciated that controlling and maintaining a conditioned environment can increase quality of the manufactured product. For example, conditioning the fluid within the deployable barrier 702 to provide adiabatic conditions, isothermal conditions, isobaric conditions, isentropic conditions, etc. can lead to superior quality control.

In some examples, the deployable barrier 702 can be deployed without inflating and without a fluid. For example, a mechanical mechanism can be attached the deployable barrier 702 and configured to deploy in space (e.g., while orbiting the earth). In such examples, the space within the deployable barrier 702 is (or near) a vacuum. In some example, the first cargo container 504A and/or the second cargo container 504B can include a conditioner 704 that provides environmental conditions suitable for a vacuum such as electromagnetic radiation (e.g., infrared radiation, targeted laser application, x-ray, etc.).

The deployable barrier 702 can be made of different types of materials. In some examples, the deployable barrier 702 is made of aluminum foil and KAPTON® tape. In some examples, the deployable barrier 702 is made of ethylene tetrafluoroethylene (ETFE), which is a fluorine-based polymer with a relatively clear film and a high corrosion resistance and strength over a wide temperature range. In some such examples, the ETFE deployable barrier 702 is reinforced with carbon fibers printed across the inflated surface. In some examples, the deployable barrier 702 is made of polytetrafluoroethylene (PTFE). In some examples, the optional deployable barrier 702 is attached to the walls of the container 504. In some such examples, the attachment implements a suitable adhesive, such as methane acrylic (i.e. methacrylate adhesive), which is a relatively high-temperature adhesive that can withstand temperature up to 400° C. In some such examples, the attachment implements hook-and-loop fasteners such as VELCRO®. In some such examples, the attachment implements zippers.

Figure 8:
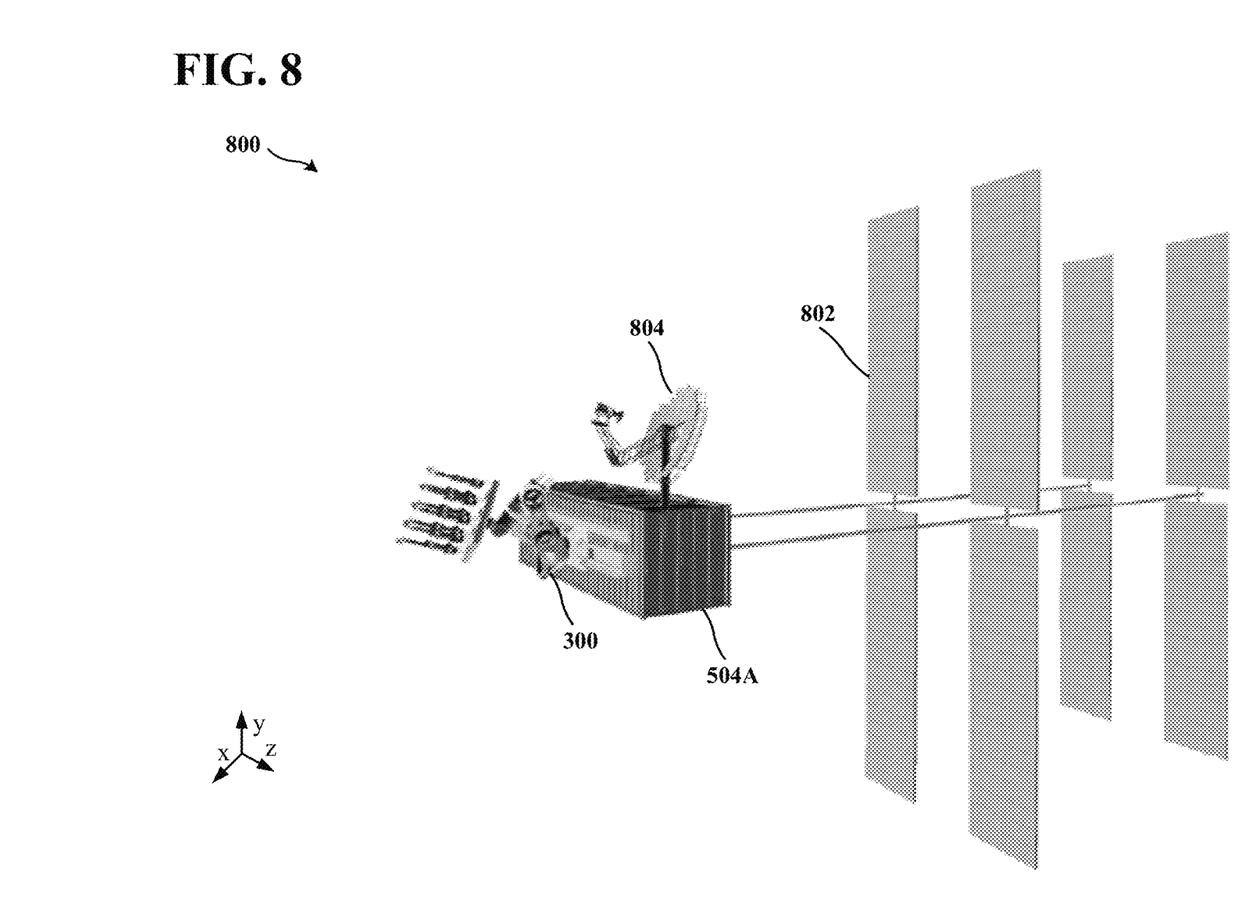
FIG. 8 illustrates a deployable power source in a robotic system according to an example of the present invention.

FIG. 8 illustrates a power source 802 in robotic system 800. The power source 802 in this example is an array of solar panels affix to the first cargo container 504A. In some examples, one or more cargo containers includes a power source configured to generate and store power for the cargo container or an array of cargo containers. In some such examples, the power source 802 includes one or more solar panels. In some such examples, the power source 802 includes one or more wind turbines. In some examples, one or more cargo containers are designated for power generation. In some examples, each more cargo container includes its own power generation source. In some examples, the power source 802 is deployable outside the container. In such examples, the power source is configured to mechanically fold back into and out of the container.

In addition to a power source 802, the robotic system 800 includes a transceiver 804 configured to transmit and receive signals from an access point. In some examples, the transceiver 804 is a wireless transceiver. In such examples, the transceiver 804 can include a deployable satellite dish, as depicted in FIG. 8 and the access point can be either a satellite or a base station. In some examples, the transceiver is connected to a high-speed bus such as optical fiber or electric transmission lines (e.g., Ethernet, coaxial broadband cable, etc.). In some examples, the transceiver 804 is configured to transmit and receive data for controlling the robotic system 800 remotely.

Figure 9:
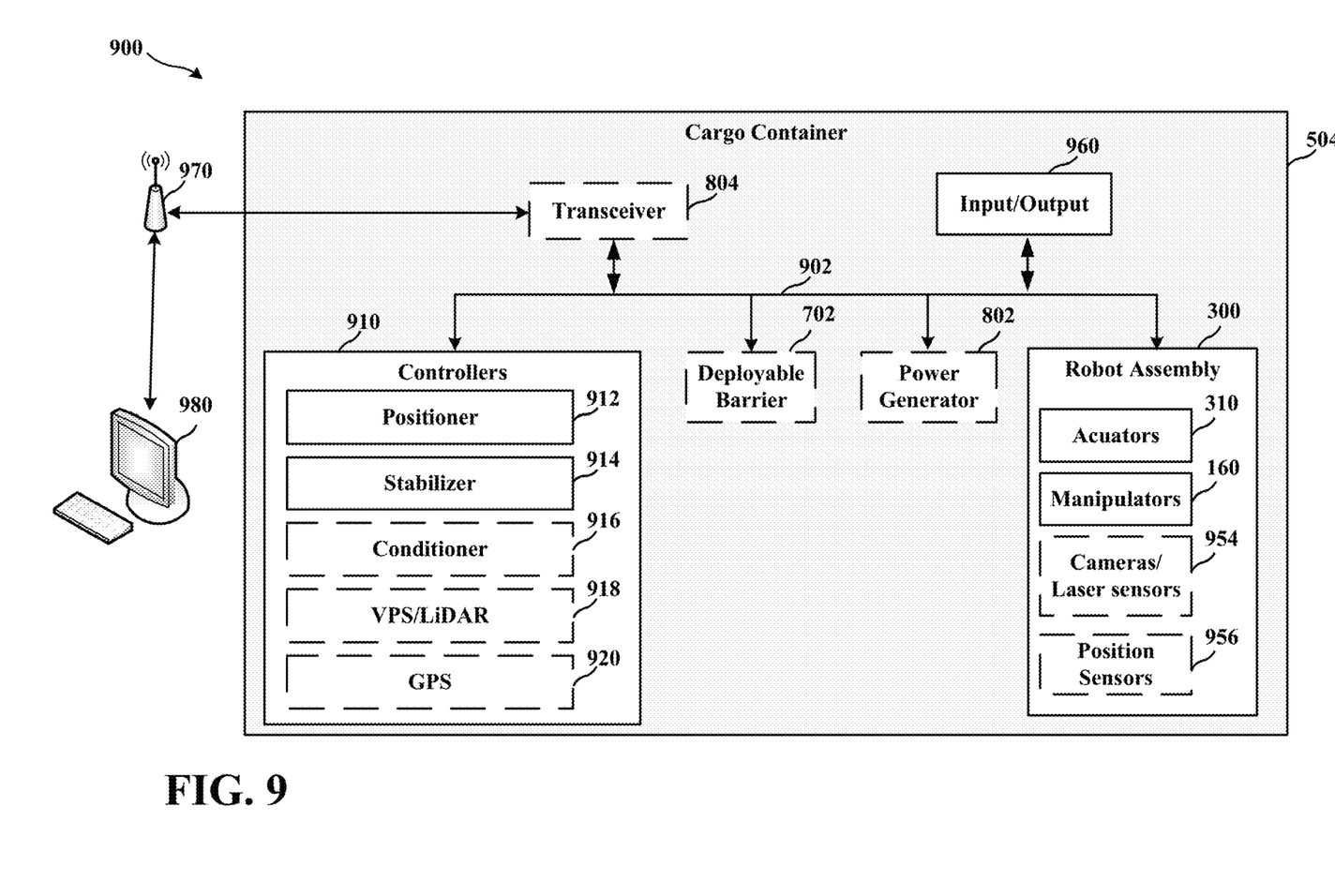
FIG. 9 is a diagram illustrating an exemplary robotic system according to an example of the present invention.

FIG. 9 is a diagram illustrating an exemplary robotic system 900. One implementation of the robotic system 900 is a cargo container 504, as depicted in FIG. 5 through FIG. 8. The exemplary robotic system 900 on the cargo container 504 can be implemented with a bus architecture, represented generally by the bus 902. The bus 902 can include any number of interconnecting buses and bridges depending on the specific application of the robotic system 900 and the overall design constraints. The bus 902 links together various circuits including one or more processors and/or hardware components, represented by one or more controllers 910, the optional deployable barrier 702, the optional power generator 802, the scaled robot assembly 300, the optional transceiver 804, and input/output BUS connection 960. The bus 902 also link various other circuits such as timing sources, peripherals, voltage regulators, and power management circuits, which are well known in the art, and therefore, will not be described any further.

The controllers 910 include one or more processors electrically coupled to a computer-readable medium/memory. The processors are responsible for general processing, including the execution of software stored on the computer-readable medium/memory. The controllers 910 include a controller for a positioner 912, a stabilizer 914, an option conditioner 916, and optional video positioning system (VPS) or LiDAR 918, and an optional global positioning system (GPS) receiver 920.

The positioner 912 tracks the position of each component of the robot assembly 300. The positioner 912 receive signals from one or more positioning sensors 956 affixed to any one of the arm assembly 110, the positioning plate 220, and one or more phalanges of the phalange assembly 150. In some examples, the one or more positioning sensors 956 are relative positioning sensors (e.g., displacement sensors). In some examples, the one or more position sensors is any one of a linear, angular, or multi-axial sensor. In some examples, the one or more positioning sensors 956 are capacitive displacement sensor. In some examples, the one or more positioning sensors 956 are ultrasonic sensors. In some examples, the one or more positioning sensors 956 are optical proximity sensors. In some examples, the positioner 912 is a relative positioning controller configured to manipulate a position for each phalange assembly of an array of phalange assemblies.

The stabilizer 914 is a motion-error corrector that compensates for positioning error of the robot assembly 300. In general, the stabilizer 914 is a controller for determining the relative position of the arm assembly 110, the positioning plate 220, and one or more phalanges of the phalange assembly 150 and includes a motion-error corrector for stabilizing each phalange assembly of an array of phalange assemblies independently. In some examples, the stabilizer 914 compensates for vibration error in any one of the arm assembly 110, the positioning plate 220, and one or more phalanges of the phalange assembly 150. In some examples, the stabilizer 914 is implemented as a proportional-integral-derivative (PID) controller. In such examples, loop feedback provides continuously modulated control. In some such examples, the stabilizer 914 implements heuristic tuning. In some examples, the stabilizer 914 implements feedback control. In some examples, the stabilizer 914 implements feed-forward control. In some examples, the stabilizer 914 combines the feedback (or closed-loop) control of a PID controller with feed-forward (or open-loop) control.

The conditioner 916 controls the fluid conditioner 704 of the cargo container 504, which is configured to control humidity, temperature, pressure, and purity (e.g., fluid filter) of the fluid within the deployable barrier 702. In some examples, the conditioner 916 is a PID-type controller. In some such examples, the stabilizer 914 implements heuristic tuning. In some examples, the conditioner 916 implements feedback control. In some examples, the conditioner 916 implements feed-forward control. In some examples, the conditioner 916 combines the feedback (or closed-loop) control of a PID controller with feed-forward (or open-loop) control.

The VPS/LiDAR 918 controls the cameras and laser sensors 954 of the robot assembly 300. In some examples, the VPS/LiDAR 918 includes one or more optical sensors affixed to any one of the arm assembly, the positioning plate 220, and the at least one phalange assembly 150, and the one or more interchangeable manipulators 160. The one or more optical sensors are configured to determine respective positions of any one of the arm assembly 110, the positioning plate 220, one or more phalanges of the phalange assembly 150, and the one or more interchangeable manipulators 160. In some examples, at least one of the one or more optical sensors is a camera. In some examples, two or more of the one or more optical sensors are cameras configured to capture video images to triangulate positions of any one of the arm assembly 110, the positioning plate 220, one or more phalanges of the phalange assembly 150, and the one or more interchangeable manipulators 160. In some such examples, the one or more optical sensors are detached from the robot assembly 300 and configured to capture the video images. In some such examples, the detached one or more optical sensors are configured to capture the video images of adjacent robots assemblies (e.g., 300A, 300B, 300C, 300C, 300D, 300E, 300F, 300G, 300H).

In some examples, the VPS/LiDAR 918 includes projectors for projecting structured light. In such examples, the VPS/LiDAR 918 includes one or more optical sensors configured to capture deformation of the structured light on any portion of robot assembly 300 to calculate the depth and surface information of any one of the arm assembly 110, the positioning plate 220, one or more phalanges of the phalange assembly 150, and the one or more interchangeable manipulators 160. In some examples, the VPS/LiDAR 918 includes a laser affixed to the arm assembly 110 and configured to reflect light off any one of the arm assembly 110, the positioning plate 220, one or more phalanges of the phalange assembly 150, the one or more interchangeable manipulators 160, and to one or more optical sensors 954. In some examples, the VPS/LiDAR 918 transmits and receives laser signals from the laser and calculates differences in laser light return time to determine 3D position of any one of the arm assembly 110, the positioning plate 220, and one or more phalanges of the phalange assembly 150. In some examples, the VPS/LiDAR 918 includes a user interface. In such examples, the user interface is configure to actuate any portion of robot assembly 300 responsive the user inputs (e.g., inputs from a joystick, mouse, keyboard, touchscreen, voice/auditory, laser pointer, motion sensing device, etc.).

The global positioning system (GPS) receiver 920 receives satellites signals from the global positioning system controls determines positioning of components of the robot assembly 300. In some examples, the global positioning system receiver 920 includes one or more positioning sensors 956 affixed to any one of the arm assembly 110, the positioning plate 220, and one or more phalanges of the phalange assembly 150. In some examples, GPS receiver implements any one of a differential GPS (DGPS) or real time kinematic GPS (RTK GPS).

The optional deployable barrier 702 is configured to envelop the robot assembly 300 and contain an environmentally controlled chamber. Electronics to the deployable barrier 702 include actuators 310, solenoids, relays etc. In some examples, the deployable barrier 702 include includes gauges to determine the status of the deployable barrier 702 such as strain gauges (e.g., piezo resistors), temperature gauges (e.g., thermocouples), pressure gauges, etc.

The optional power generator 802 is configured to generate and store power for the cargo container 504 or an array of cargo containers. The power generator 802 is configured to be deployable outside the cargo container 504. The power generator 802 includes one or more batteries electrically coupled to the bus 902 to store energy for the robot assembly 300.

The transceiver 804 includes a receiver and a transmitter that are implanted with shared components or separate components. The transceiver 804 is electrically coupled to one or more antennas or high-speed transmission lines (e.g., Ethernet). The transceiver 804 provides a means for communicating with various other apparatus over a transmission medium. The transceiver 804 receives a signal from an access point 970 and or base station 980 via the one or more antennas or high-speed transmission lines (e.g., Ethernet). The transceiver 804 extracts the information from the received signal, and provides the extracted information to the controllers 910 to articulate the robot assembly 300 remotely. In addition, the controllers 910 can provide information to the transceiver 804, which generates a signal to be applied to the one or more antennas or high-speed buses (e.g., Ethernet) to relay information about the robot assembly 300 to the access point 970 or base station 980.

The input/output 960 is one or more connections to the bus 902 for communication between adjacent cargo containers and facilitate orchestrated concert functionality. In some examples, the input/output 960 is a serial connection (e.g., ISA, PATA, SCSI, PCI, etc.). In some examples, the input/output 960 is a parallel connection (e.g., USB, Firewire, serial ATA, serial RS-232, etc.). In some examples, the input/output 960 include both a serial connection and a parallel connection.

Figure 10:
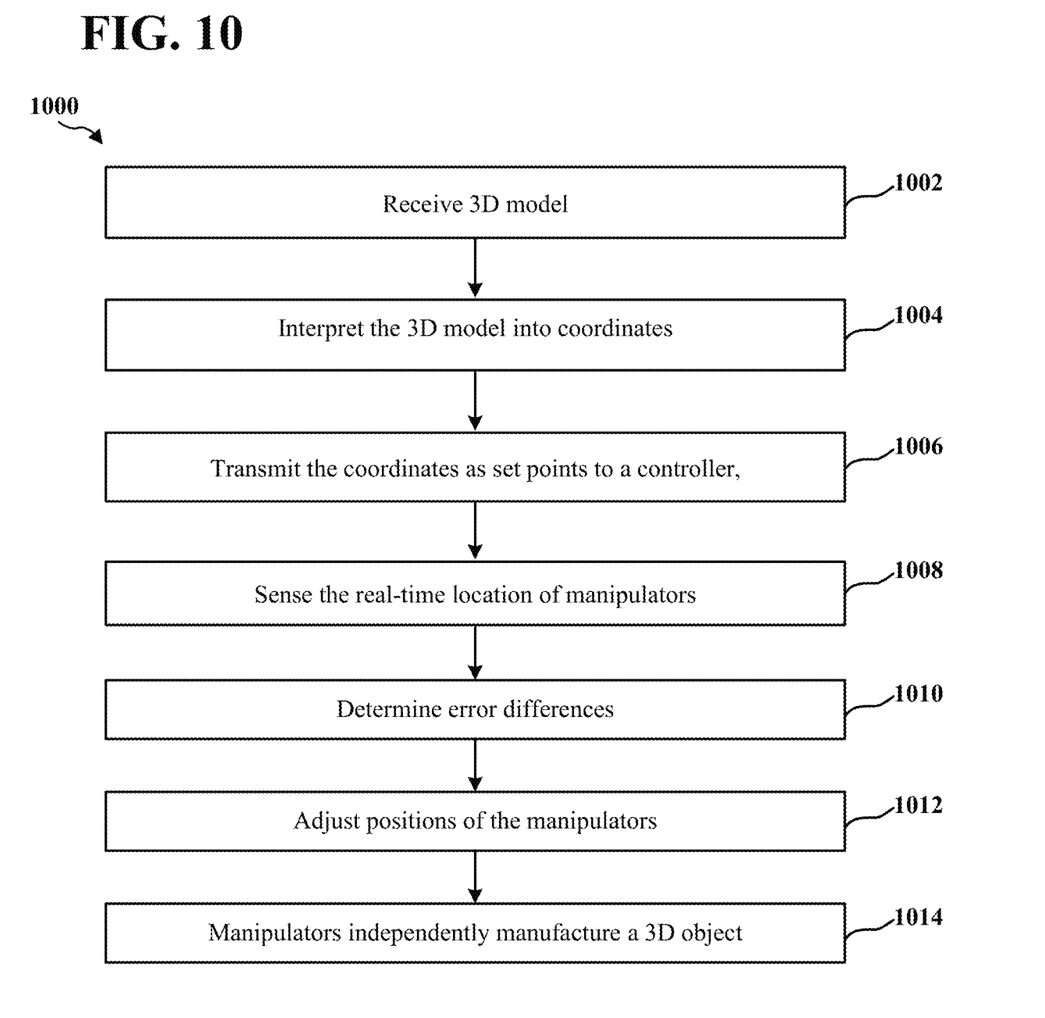
FIG. 10 is an exemplary flow diagram for manufacturing a 3D object.

FIG. 10 is an exemplary flow diagram for manufacturing a 3D object. Process 1000 can be performed by a robotic system having a computer or other electronic device that is electrically coupled to robotic assembly 300 with an arm assembly 110, a phalange assembly 150, and one or more phalanges of a phalange assembly 150. The robotic system includes a stabilizer 914 that is configured to correct for position error of the one or more phalanges of the phalange assembly 150. This configuration provides for independent operation of the one or more phalanges and provides for a high quality manufacture object. It is contemplated that the one or more phalanges are configured to manufacture an object in concert, which increases the throughput of the robotic system.

At operation 1002, the robotic system of process 1000 receives a 3D model corresponding to a 3D object. For example, a user can design an object provide the design to the robotic system 300 to be additively manufactured (e.g., 3D printed).

At operation 1004, the robotic system of process 1000 interprets the 3D model into coordinates. In interpreting the 3D model the robotic system determines the position for the one or more phalanges of a phalange assembly 150, particularly the one or more interchangeable manipulators 160. In some examples, the robotic system determines the positions of arm assembly 110 and the phalange assembly 150 based on the position of the one or more interchangeable manipulators 160. In some such examples, the positions of arm assembly 110 and the phalange assembly 150 are adjusted to optimize the position of the one or more interchangeable manipulators 160.

At operation 1006, the robotic system of process 1000 transmits the coordinates as set points to a controller. In some examples, the controller is a microcontroller with one or more processors electrically coupled to memory. In general, the controller is configured to manipulate a robot that includes the first phalange assembly with a first interchangeable manipulator operatively coupled to an arm assembly and a second phalange assembly with a second interchangeable manipulator operatively coupled to the arm assembly 110. The arm assembly 110 is self-similar to one or both of the first phalange assembly and the second phalange assembly.

At operation 1008, the robotic system of process 1000 senses the real-time location of the first interchangeable manipulator and the second interchangeable manipulator. For example, in some examples, the robot system includes the robotic assembly 300 with one or more positioning sensors 956 affixed to any one of the arm assembly 110, the positioning plate 220, and one or more phalanges of the phalange assembly 150, which operatively couples to the first interchangeable manipulator, and the second interchangeable manipulator. The real-time positions of the first interchangeable manipulator and the second interchangeable manipulator is determined from the received signals of the one or more positioning sensors 956.

In some instances, the position of the arm assembly 110, the positioning plate 220, and one or more phalanges of the phalange assembly 150 is inaccurate due to vibrations, weight, etc. To compensate the robotic system of process 1000 determines error differences between set points and the real-time locations, as depicted at operation 1010. As such, the robotic system of process 1000 adjusts position of any one of the arm assembly, the at least one phalange assembly, and the interchangeable manipulator independently to reduce the error differences between the set points and the real-time locations, as depicted at operation 1012.

At operation 1014, the robotic system of process 1000 the manipulators independently manufacture a 3D object. For example, in some examples the first interchangeable manipulator is a first printer head and the second interchangeable manipulator is a second printer head. In such an example, the robotic system of process 1000 deposits, via the first printer head, a first bead of material at a first coordinate of the 3D model. The robotic system of process 1000 further deposits, via the second printer head, a second bead of material at a second coordinate of the 3D model. It is contemplated that the first printer head and the second printer head operate independently such that the first bead is deposited simultaneously with the second bead.

It should be appreciate that the interchangeable manipulators can be tool fixtures for manufacturing such as, a shaping actuator, screw driver, socket, drill bit, impact driver, welder, laser, nozzle, mirror, etc. For example, in some examples, the robot includes a third phalange assembly with a third interchangeable manipulator operatively coupled to the arm assembly. In such an example, the robotic system of process 1000 includes a shaping actuator that smooths, via the shaping actuator, the first bead of material.

It should be appreciated that the specific order or hierarchy of blocks in the processes and/or flowcharts disclosed is an illustration of exemplary approaches. Based upon design preferences, it is understood that the specific order or hierarchy of blocks in the processes and/or flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various examples described herein. Various modifications to these examples will be readily apparent to those skilled in the art, and the generic principles defined herein may be applied to other examples. Thus, the claims are not intended to be limited to the examples shown herein, but are to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other examples. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various examples described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed under 35 U.S.C § 112(f) unless the element is expressly recited using the phrase "means for."

What is claimed is:

1. A robotic system, comprising:
   an arm assembly including:
     a pedestal;
     a first member operatively coupled to an opposing end of the pedestal, wherein the first member is configured to rotate about the opposing end of the pedestal; and
     a second member operatively coupled to an opposing end of the first member, wherein the second member is configured to rotate about the opposing end of the first member;
   a joint operatively coupled to an opposing end of the second member;
   at least one phalange assembly operatively coupled to the joint, wherein the at least one phalange assembly is a miniature version of the arm assembly, the at least one phalange assembly including:
     a third member operatively coupled to the joint;
     a fourth member operatively coupled to an opposing end of the third member,
   wherein the fourth member is configured to rotate about the opposing end of the third member;
     and a fifth member operatively coupled to an opposing end of the fourth member,
   wherein the fifth member is configured to rotate about the opposing end of the fourth member;
   a positioning plate interposed between the joint and the third member; and
   an interchangeable manipulator operatively coupled to the opposing end of the fifth member.

2. The robotic system of claim 1, further comprising:
   a relative positioning controller configured to compensate position of the at least one phalange assembly due to vibration error in the arm assembly.

3. The robotic system of claim 1, further comprising: an array of phalange assemblies.

4. The robotic system of claim 3, further comprising:
   a relative positioning controller, wherein the relative positioning controller is configured to manipulate a position for each phalange assembly of the array of phalange assemblies.

5. The robotic system of claim 4, wherein the relative positioning controller includes a motion-error corrector for stabilizing each phalange assembly of the array of phalange assemblies independently.

6. The robotic system of claim 3, further comprising:
   one or more optical sensors affixed to any one of the arm assembly, the positioning plate, and the at least one phalange assembly, wherein the one or more optical sensors are configured to determine respective positions of any one of the arm assembly, the positioning plate, and one or more phalanges of the phalange assembly.

7. The robotic system of claim 6, wherein at least one of the one or more optical sensors is a camera.

8. The robotic system of claim 6, wherein two or more of the one or more optical sensors are cameras configured to capture video images to triangulate positions of any one of the arm assembly, the positioning plate, and one or more phalanges of the phalange assembly.

9. The robotic system of claim 6, further comprising:
   a laser affixed to the arm assembly and configured to reflect light off any one of the arm assembly, the positioning plate, and one or more phalanges of the phalange assembly and to the one or more optical sensors.

10. The robotic system of claim 3, further comprising:
    a global positioning system receiver including one or more positioning sensors affixed to any one of the arm assembly, the positioning plate, and the at least one phalange assembly.

11. The robotic system of claim 1, wherein the joint is configured to rotate about two mutually orthogonal axes.

12. The robotic system of claim 1, wherein the interchangeable manipulator is a printer head assembly configured to deposit one or more filaments on a work-piece.

13. The robotic system of claim 12, wherein the printer head assembly has a coaxial extruder with at least one filament of the one or more filaments being coaxially extruded with respect to another.

14. The robotic system of claim 1, further comprising:
    one or more rollers operatively coupled to the pedestal; and
    one or more rails interlocking with the one or more rollers.

15. A robotic system, comprising:
    a cargo container;
    one or more rails operatively coupled to a wall of the cargo container;
    a deployable barrier configured to be deployed from the cargo container and is operatively coupled to the wall of the cargo container;
    one or more rollers, wherein the one or more rollers interconnect with the one or more rails; and
    an arm assembly, wherein the deployable barrier is configured to envelop the arm assembly, the arm assembly including:
      a pedestal operatively coupled to the one or more rollers;

a first member operatively coupled to an opposing end of the pedestal, wherein the first member is configured to rotate about the opposing end of the pedestal; and a second member operatively coupled to an opposing end of the first member, wherein the second member is configured to rotate about the opposing end of the first member;

a joint operatively coupled to an opposing end of the second member; and at least one phalange assembly operatively coupled to the joint.

16. The robotic system of claim 15, wherein the at least one phalange assembly includes:

a third member operatively coupled to the joint;

a fourth member operatively coupled to an opposing end of the third member, wherein the fourth member is configured to rotate about the opposing end of the third member; and a fifth member operatively coupled to an opposing end of the fourth member, wherein the fifth member is configured to rotate about the opposing end of the fourth member; and an interchangeable manipulator operatively coupled to the opposing end of the fifth member.

17. The robotic system of claim 16, wherein the at least one phalange assembly is self-similar to the arm assembly.

18. The robotic system of claim 15, wherein the wall of the cargo container includes a door configured to expose the arm assembly to an outside of the cargo container.

19. The robotic system of claim 15, further comprising:
an environmental controller; and
one or more environmental conditioners configured to control environmental parameters within the deployable barrier.

20. A robotic system, comprising:
a cargo container;
deployable power generators configured to be deployed outside the cargo container;
one or more rails operatively coupled to a wall of the cargo container;
one or more rollers, wherein the one or more rollers interconnect with the one or more rails; and
an arm assembly including:
a pedestal operatively coupled to the one or more rollers;
a first member operatively coupled to an opposing end of the pedestal, wherein the first member is configured to rotate about the opposing end of the pedestal; and
a second member operatively coupled to an opposing end of the first member, wherein the second member is configured to rotate about the opposing end of the first member;
a joint operatively coupled to an opposing end of the second member; and
at least one phalange assembly operatively coupled to the joint.

21. The robotic system of claim 15, further comprising:
a transceiver configured to transmit and receive data for controlling the robotic system remotely.

22. The robotic system of claim 15, wherein the cargo container is configured to interlock with one or more cargo containers on adjacent sides of the cargo container.

23. The robotic system of claim 16, further comprising:
a positioning plate interposed between the joint and the third member; and
an array of phalange assemblies self-similar to the arm assembly.

24. The robotic system of claim 23, further comprising:
a relative positioning controller, wherein the relative positioning controller is configured to manipulate a position for each phalange assembly of the array of phalange assemblies.

25. The robotic system of claim 24, wherein the relative positioning controller includes a motion-error corrector for stabilizing each phalange assembly of the array of phalange assemblies independently.

26. The robotic system of claim 23, further comprising:
one or more optical sensors affixed to any one of the arm assembly, the positioning plate, and the at least one phalange assembly, wherein the one or more optical sensors are configured to determine respective positions of any one of the arm assembly, the positioning plate, and one or more phalanges of the phalange assembly.

27. The robotic system of claim 26, wherein at least one of the one or more optical sensors is a camera.

28. The robotic system of claim 26, wherein two or more of the one or more optical sensors are cameras configured to capture video images to triangulate positions of any one of the arm assembly, the positioning plate, and one or more phalanges of the phalange assembly.

29. The robotic system of claim 26, further comprising:
a laser affixed to the arm assembly and configured to reflect light off any one of the arm assembly, the positioning plate, and one or more phalanges of the phalange assembly and to the one or more optical sensors.

30. The robotic system of claim 23, further comprising:
a global positioning system receiver including one or more positioning sensors affixed to any one of the arm assembly, the positioning plate, and the at least one phalange assembly.

31. The robotic system of claim 15, wherein the joint is configured to rotate about two mutually orthogonal axes.

32. The robotic system of claim 16, wherein the interchangeable manipulator is a printer head assembly configured to deposit one or more filaments on a work-piece.

33. The robotic system of claim 32, wherein the printer head assembly has a coaxial extruder with at least one filament of the one or more filaments being coaxially extruded with respect to another.

* * * * *